Jan. 28, 1969  C. L. SPINDLER  3,423,942
STANDING DETONATION WAVE ROCKET ENGINE
Filed Sept. 20, 1963

INVENTOR.
CLINTON L. SPINDLER
BY
P.H. Firsht
ATTORNEY.

United States Patent Office 3,423,942
Patented Jan. 28, 1969

3,423,942
STANDING DETONATION WAVE
ROCKET ENGINE
Clinton L. Spindler, China Lake, Calif., assignor to the United States of America as represented by the Secretary of the Navy
Filed Sept. 20, 1963, Ser. No. 311,612
U.S. Cl. 60—207                     8 Claims
Int. Cl. F23r 1/06

The invention herein described may be manufactured and used by or for the Government of the United States for governmental purposes without the payment of any royalties thereon or therefor.

The present invention relates to rocket or jet engines and more particularly to a propulsion system which employs a standing detonation wave for releasing thermal energy in a rocket nozzle.

The ever-increasing demand for higher performance rocket propulsion systems has resulted in the development of numerous high-energy propellant formulations. However, as the energies of the propellants increase, so do the flame temperatures also increase, some to values higher than 10,000° R. Because of these high flame temperatures many otherwise desirable propellant formulations are practically unusable since there are no present-day construction materials that can withstand these temperatures and their containment in the combustion chamber of a conventional rocket is therefore practically impossible. Thus, it is desirable to develop new rocket propulsion techniques which are capable of utilizing high energy propellant formulations without exceeding the limitations of present-day structures and materials of rocket engines.

The present invention overcomes many of the attendant problems of high combustion temperatures by partitioning the propellant energy release into two zones in a manner which can take advantage of the thermal insulation properties of the fluid boundary layer along the nozzle wall; part of the combustion process being carried out in the combustion chamber and part carried out in a standing detonation wave zone in the nozzle itself.

It is therefore an object of the present invention to provide a rocket engine which overcomes many of the problems posed by high combustion temperatures.

Another object is the provision of a rocket engine in which release of the energy takes place in two zones, part in the combustion chamber, part in the rocket nozzle itself.

A further object is to provide a rocket engine which employs a standing detonation wave to release thermal energy in the rocket nozzle.

Other objects, advantages and novel features of the invention will become apparent from the following description of the invention when considered in conjunction with the accompanying drawings wherein.

In order to better understand the functions of a rocket engine which employs a standing detonation wave, it is desirable first to examine the characteristics of the detonation wave. In general, it can be said that a detonation wave is composed of an aerodynamic shock followed by the combustion of any chemical reactants which exist in the gas stream under consideration. Consider a supersonic gas stream of chemically reactive ingredients that has a temperature too low for spontaneous ignition of the ingredients and let this gas stream pass through a normal shock front. As the gas passes through the shock wave it is reduced from supersonic to subsonic velocity and, at the same time, experiences several changes of state. The static pressure of the gas is increased and the stagnation pressure decreased while the static temperature is increased and the stagnation temperature remains constant. If the statis temperature rises higher than the ignition temperature of the combustible gas mixture, the gas will go into a state of chemical non-equilibrium and combustion will occur downstream from the shock wave. The heat released by the combustion will cause the gas stream to undergo a velocity increase which is accompanied by an increase in both the static and stagnation temperatures of the stream and a decrease in both the static and stagnation pressures thereof. The velocity increase downstream depends upon the amount of heat which is released in the combustion process. However, the final velocity of the stream leaving the detonation wave cannot exceed the sonic velocity (Mach 1) at the existing stream temperature. If the combustion process releases more heat than is required to achieve sonic velocity the detonation wave will become unstable and destroy itself. When sonic wave exit velocity conditions exist the detonation is called a Chapman-Jouguet (C-J) detonation wave.

As will be appreciated from a reading of articles or texts such as "Thermodynamics of Fluid Flow" by N. A. Hall, Prentice-Hall (2nd printing), Englewood Cliffs, New Jersey, March 1956; "Considerations for the Attainment of a Standing Detonation Wave" by J. Rutkowski and J. A. Nicholls, Proceedings, Gas Dynamics Symposium on Aerothermochemistry, Northwestern University, 1956; "Studies in Connection with Stabilized Gaseous Detonation Waves" by J. A. Nicholls, E. K. Dabora and R. L. Gealer, Seventh Symposium (International) on Combustion, Butterworths Scientific Publications, London, 1959; "A Study of Supersonic Combustion" by Robert A. Gross and Wallace Chinitz, Journal of the Aero/Space Sciences, volume 27, 1960; and other literature on the subject, attainment of a standing detonation wave is dependent upon the type of fuel and oxidizer employed, the physical characteristics of the combustion device, the concentration of the combustible materials in the device, and the gas dynamics of the flow process. Accordingly, the present invention will be described only in general terms.

Figure 1:
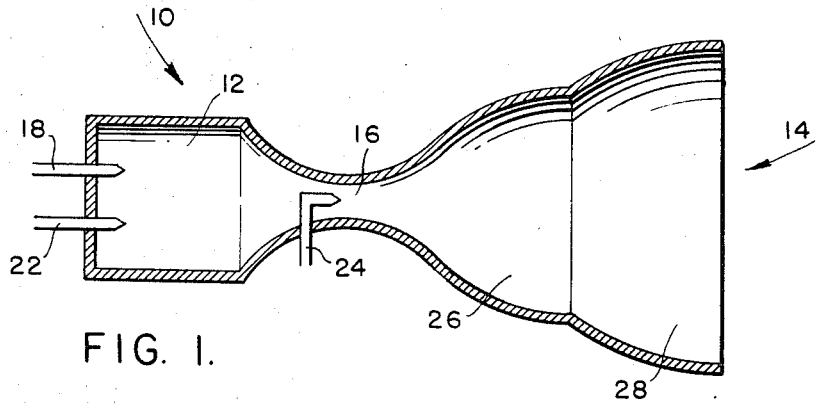
FIG. 1 is a schematic view of the standing detonation wave (SDW) rocket engine of the present invention.

Referring now to the drawings, wherein like reference characters refer to like or corresponding parts throughout the several views, there is shown in FIG. 1 a schematic view of an SDW rocket engine in accordance with the present invention designated generally by reference numeral 10. The rocket engine 10 comprises a combustion chamber portion 12 and a nozzle 14, joined by a throat portion 16. Chamber 12 is provided with primary injector means 18 and 22 suitably connected to sources of liquid fuel and oxidizer, respectively, and throat portion 16 has associated therewith a secondary injector means 24 connected to a source of liquid fuel or oxidizer, as necessary, for reasons hereinafter appearing. Nozzle 14 is formed with a primary De Laval nozzle portion 26 and a secondary De Laval nozzle portion 28.

Figure 2:
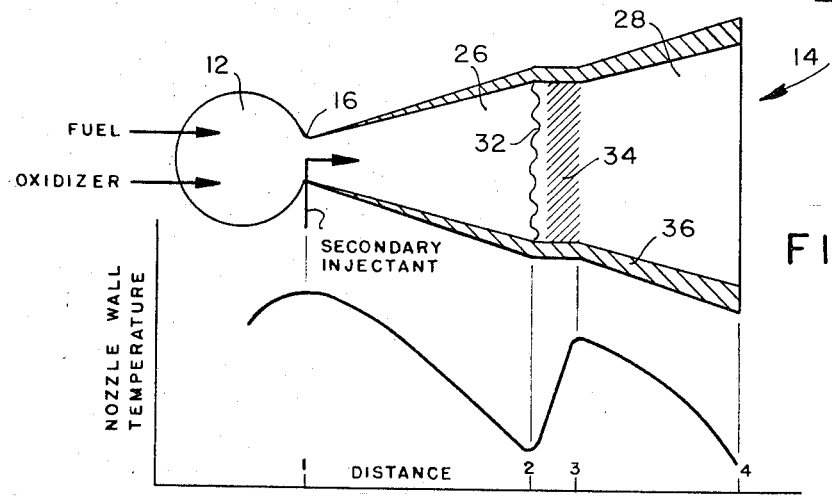
FIG. 2 is a schematic view of the SDW rocket engine and a graph illustrating the relation of the nozzle wall temperatures.

For a better understanding of the operation of the present invention and the functions of its several parts, reference may be had to FIG. 2. Fuel and oxidizer, with one deficient (that is, in a nonstoichiometric ratio) are injected into chamber 12 and burned or reacted therein to yield either a fuel-rich or an oxidizer-rich gas, as desired, at a temperature which is not higher than can be withstood by the materials of which the chamber 12 and nozzle 14 are made. Typically, this could be 6000–7000° R. A secondary injectant (fuel or oxidizer as necessary to bring the over-all fuel-to-oxidizer ratio up to stoichiometric) is injected into the hot gas stream at or near the sonic throat (station 1) in portion 16, prior to expansion in nozzle 14. This gaseous mixture, containing unreacted fuel and oxidizer, is detonable and is expanded isentropically and supersonically, with an accompanying reduction in temperature, in nozzle portion 26 to a velocity at which a detonation would occur. At this point (station 2), auto-ignition takes place and a chemical reaction is triggered by the shock wave 32, and heat is added by releasing the energy of the unreacted fuel and oxidizer in the standing detonation wave heat addition zone 34 immediately downstream from shock wave 32. The resulting high temperature gases leave the detonation wave (station 3) at local sonic velocity and are again expanded isentropically and supersonically in nozzle portion 28 to ambient exit pressure (station 4) and exhausted rearwardly at high velocity, the nozzle walls being shielded from the high temperature gases by a relatively cool boundary layer 36 of gases from the primary reaction.

The amount of secondary heat which can be added by the detonation wave has an upper stability limit which is determined for a given gas composition by the combustion chamber temperature and the detonation Mach number. This limit is classically referred to as the Chapman-Jouguet or C-J limit and is characterized by sonic flow at the detonation exit plane. Phenomenonalogically, the detonation wave may be separated into two parts: a normal shock wave (station 2) which decelerates the flow from supersonic to subsonic velocity, followed by a constant area heat addition process (stations 2–3), which reaccelerates the subsonic flow resulting from the normal shock.

The degree to which the subsonic flow is reaccelerated by the constant area heating process is dependent directly upon the amount of heat added. However, entropy considerations dictate that the flow cannot be accelerated above the sonic velocity, i.e., Mach 1. This is the C-J stability limit for heat addition. Any attempt to release more heat into the gas stream will induce pressure forces which will drive the detonation wave upstream and cause dynamic instability. The higher the Mach number, the greater the amount of heat which can be added before the C-J stability limit is reached. If C-J heating is not exceeded at any given Mach number, the detonation wave will be completely stable. A more complete explanation of this phenomenon may be found in texts on fluid flow thermodynamics, for example, Hall's "Thermodynamics of Fluid Flow," hereinbefore mentioned.

The net thrust produced by the SDW rocket engine is the net result of the axial pressure-area forces acting on the walls of the combustion chamber, on the primary De Laval nozzle portion and on the secondary De Laval nozzle portion. The detonation wave is a constant area process and does not contribute thrust. However, the thrust contributed by the secondary nozzle portion is dependent upon the amount of secondary heat added by the detonation wave.

Because of stagnation pressure losses in the detonation process, the ultimate performance and specific impulse of very-high-flame-temperature propellants will always be somewhat less than in an SDW rocket than in a hypothetical isenthalpic rocket engine. Nevertheless, in practice the SDW rocket engine will always out perform a conventional rocket engine which is unable to fully utilize the available high flame temperatures.

Figure 3:
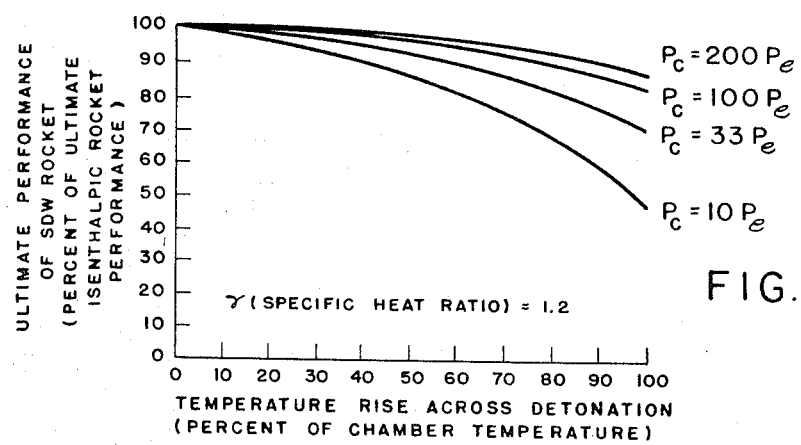
FIG. 3 is a graph showing variation of ultimate performance of the SDW rocket engine with detonation temperature rise.

FIG. 3 shows curves indicating the relation between ultimate performance and temperature rise. For a given set of chamber pressuers ($P_c$) and exhaust pressure ($P_e$) ratios there is a maximum obtainable performance increase. An increase in chamber pressure or in exhaust pressure ratio will increase performance with ultimate performance being determined according to the relations shown.

Figure 4:
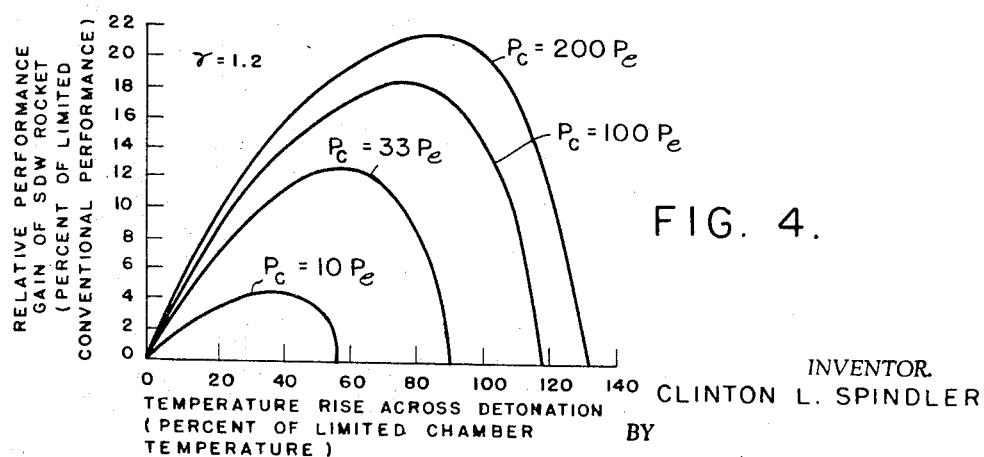
FIG. 4 is a graph showing variation of performance gain with detonation temperature rise.

Unlike an isenthalpic propulsion system, the performance of the SDW rocket engine, as seen in FIG. 4, does not continually increase as the total engine temperature is increased. FIG. 4 should not be interpreted to mean that the best over-all performance is obtained by operating at the peaks of the curves; the peaks merely indicate the maximum gain that could (not should) be obtained for a given chamber to exhaust pressure ratio. FIGS. 3 and 4, taken together, show that for the SDW rocket, the best over-all performance is obtained by operating the primary chamber at it maximum permissible temperature and adding in the detonation process the additional heat which could not be tolerated in the primary chamber. In any event, the total detonation temperature rise should never exceed the values determined by the peaks of the performance gain curves of FIG. 4.

Figure 5:
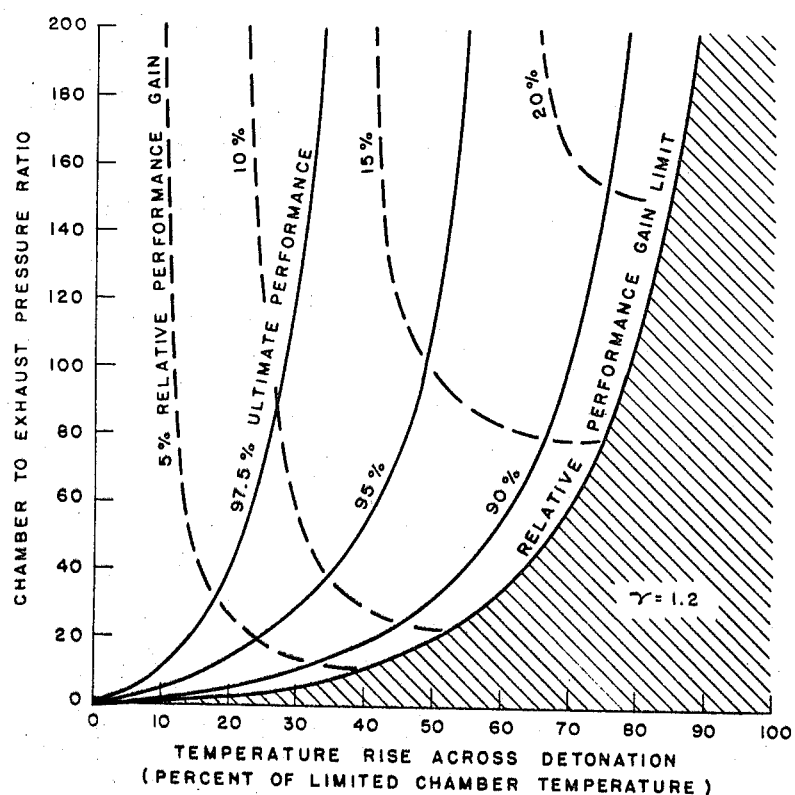
FIG. 5 is a graph showing the relation of performance parameters to detonation temperature rise.

FIG. 5 is in a graph showing the range of possible detonation temperature rises, at any given chamber- to exhaust-pressure ratio, which lie to the left of the relative performance gain peaks shown in FIG. 4. On the same graph are families of relative performance gains and ultimate performance curves cross plotted from FIGS. 3 and 4. This graph shows that the use of the SDW rocket will always result in a performance gain if the chamber temperature is limited to a maximum imposed by materials. FIG. 5 may be used to determine the proper relation between the important design parameters of pressure and temperature and at the same time show performance data. As an example, consider a propellant which can burn with a flame temperature of 10,000° R.; however, assume that nozzle and chamber materials will not stand up at temperatures higher than 7000° R. The detonation engine should be used in this case since we have available an excess temperature of 3000° R. or 45% of the limited chamber temperature of 7000° R. FIG. 5 shows that for a detonation temperature rise equivalent to 45% of the chamber temperature, an SDW rocket can be operated at any ratio of chamber to exhaust pressure greater than 12. Assume that the SDW rocket engine is to be used for a booster application where the chamber pressure is to be 500 p.s.i.a. and the ambient pressure is 14.7 p.s.i.a., giving a pressure ratio of 34. Knowing the pressure ratio to be 34 and the temperature rise across the detonation wave to be 45% of the chamber temperature, we may determine from FIG. 5 that the SDW rocket should achieve about an 11% increase in specific impulse compared to a conventional rocket motor operating at the same pressure ratio, but limited to a chamber temperature of 7000° R. Yet, the ultimate performance of the SDW rocket would still be 92% of the $I_{sp}$ of an isenthalpic rocket motor with the same pressure ratio and a 10,000° R. chamber temperature.

The standing detonation wave rocket engine has been analyzed theoretically and proven experimentally. It was shown that the SDW rocket engine will be capable of using very-high-flame-temperature propellants without encountering correspondingly high wall temperatures during the combustion process and will offer improved performance over conventional rocket engines which are unable to withstand the total flame temperatures. The higher the total flame temperature is above the temperature which the combustion chamber can withstand, the greater the possible performance increase by using the SDW rocket engine. It was also shown that as the chamber pressure and exhaust pressure ratio is increased the ultimate performance of the SDW rocket engine is increased and approaches the isenthalpic system. This would indicate that the SDW rocket engine would find its most favorable applications in the upper stages of rockets where high chamber to exhaust pressure ratios are practical.

Obviously, many modifications and variations of the present invention are possible in light of the foregoing teachings. It is therefore to be understood that within the scope of the appended claims the invention may be practiced otherwise than as specifically described.

What is claimed is:

1. A method of rocket propulsion comprising the steps of:
   (a) reacting a nonstoichiometric ratio mixture of a plurality of chemically reactive ingredients;
   (b) passing the reacted nonstoichiometric mixture through a sonic throat portion and thereat simultaneously adding the ingredient necessary to bring the over-all mixture ratio up to stoichiometric;
   (c) expanding the stoichiometric mixture in a first diverging nozzle portion;
   (d) passing the expanded stoichiometric mixture through a detonation zone and thereby causing ignition and reaction of the unreacted ingredients; and
   (e) expanding the reacted stoichiometric mixture in a second diverging nozzle portion.

2. A method of rocket jet propulsion comprising the steps of:
   (a) reacting a nonstoichiometric ratio mixture of fuel and oxidizer ingredients;
   (b) passing the resulting mixture through a nozzle throat portion and simultaneously adding the ingredient necessary to bring the over-all fuel-to-oxidizer ratio up to stoichiometric;
   (c) expanding the stoichiometric mixture in a first divergent nozzle portion;
   (d) passing the expanded mixture through a shock wave front for ignition of the mixture and reaction of the unreacted ingredients; and
   (e) expanding the reacted mixture in a second divergent nozzle portion.

3. A method of rocket propulsion for utilizing a fuel having a maximum flame temperature higher than the temperature which the materials of a rocket engine can withstand, comprising the steps of:
   (a) introducing fuel and oxidizer ingredients into a combustion chamber with a deficiency of one ingredient to form a nonstoichiometric ratio mixture;
   (b) combusting said nonstoichiometric ratio mixture in said chamber at a temperature not higher than can be withstood by the materials of which the chamber is made;
   (c) passing said combusted mixture through a rocket nozzle throat portion and thereat simultaneously introducing into the combusted mixture the ingredient necessary to bring the over-all fuel-to-oxidizer ratio up to stoichiometric and provide a detonable mixture;
   (d) expanding said detonable mixture isentropically and supersonically in a first divergent nozzle portion to a velocity at which auto-ignition of the detonable mixture takes place and a detonation occurs, thereby triggering chemical reaction of the unreacted fuel and oxidizer ingredients at a temperature not higher than can be withstood by the materials of which the nozzle portion is made and providing a reacted mixture; and
   (e) expanding said reacted mixture isentropically and supersonically in a second divergent nozzle portion.

4. A method of rocket propulsion comprising the steps of:
   (a) providing an amount of heat by combusting a nonstoichiometric ratio mixture of fuel and oxidizer ingredients;
   (b) passing said combusted mixture through a nozzle throat portion and thereat adding the ingredient necessary to bring the mixture ratio up to stoichiometric;
   (c) expanding said stoichiometric mixture supersonically in a first divergent nozzle portion to a velocity at which detonation occurs;
   (d) providing additional heat by reacting the unreacted ingredients in a standing detonation wave zone; and
   (e) further expanding the mixture in a second divergent nozzle portion.

5. A nozzle for use in a rocket engine, said nozzle comprising:
   a first divergent portion formed with an upstream convergent-divergent sonic throat portion and a downstream constant-area shock-inducing portion and having an unbroken surface continuity extending from said throat portion to said constant-area shock-inducing portion; and a second divergent portion sealed to the downstream end of said constant-area shock-inducing portion and diverging rearwardly therefrom.

6. A standing detonation wave rocket engine comprising:
   means for combusting a nonstoichiometric ratio mixture of fuel and oxidizer ingredients in a primary zone of burning for providing an amount of heat and generating a gas stream mixture;
   a multi-part nozzle including a convergent-divergent throat portion through which said gas stream passes;
   means within said throat portion for introducing one of said ingredients for bringing the gas stream mixture up to a stoichiometric ratio and thereby providing a combustible mixture;
   said multi-part nozzle further including a first divergent nozzle portion extending rearwardly from said throat portion and adapted for expansion of said combustible mixture isentropically and supersonically to a velocity at which auto-ignition of the combustible mixture takes place and detonation occurs for adding heat in a secondary burning zone by releasing the energy of the unreacted fuel and oxidizer in a standing detonation wave; and
   a second divergent nozzle portion extending rearwardly from said first divergent nozzle portion and adapted for further expansion of said gas stream.

7. A nozzle designed for use in a standing detonation wave rocket engine, said nozzle comprising:
   a convergent-divergent sonic throat portion through which a gas stream passes;
   means within said throat portion for adding a combustible ingredient to the gas stream;
   a first divergent nozzle portion of substantial length extending rearwardly from said throat portion and adapted to expand said gas stream isentropically and supersonically; a constant-area shock-inducing portion extending rearwardly from said first divergent portion;
   said first divergent portion joined to said throat portion and constant-area shock-inducing portion and therewith providing a continuous unbroken surface; and
   a second divergent nozzle portion sealed to and extending rearwardly from said constant-area shock-inducing portion and adapted to further expand said gas stream isentropically and supersonically.

8. A method of rocket propulsion comprising the steps of:
   (a) reacting a nonstoichiometric ratio mixture of fuel and oxidizer ingredients to provide a gas stream;
   (b) passing the gas stream through a sonic throat portion and simultaneously adding centrally of the gas stream the ingredient necessary to bring the over-all fuel-to-oxidizer ratio mixture up to stoichimetric and provide a boundary layer;

(c) expanding the stoichiometric mixture isentropically and supersonically in a first nozzle portion;

(d) passing the expanded stoichiometric mixture through a constant-area detonation zone to ignite and react the unreacted ingredients for the addition of heat centrally of the resulting mixture; and (e) expanding the resulting mixture isentropically and supersonically in a second nozzle portion.

References Cited

UNITED STATES PATENTS

| | | | |
|---|---|---|---|
| 2,952,123 | 9/1960 | Rich | 60—35.54 |
| 3,010,280 | 11/1961 | Hausmann | 60—35.6 |
| 3,034,294 | 5/1962 | Brown | 60—35.6 |
| 3,040,516 | 6/1962 | Brees | 60—35.3 |
| 3,095,694 | 7/1963 | Walter | 60—35.6 |
| 3,182,445 | 5/1965 | Lowes | 60—35.6 |

FOREIGN PATENTS 1,019,867  11/1957  Germany.

BENJAMIN A. BORCHELT, *Primary Examiner.*

GERALD H. GLANZMAN, *Assistant Examiner.*

U.S. Cl. X.R.

60—257, 217